March 27, 1962  F. BROUWER  3,027,516
MODULATOR SYSTEM FOR MICRO-POSITIONING TRANSDUCER
Filed Feb. 20, 1958

United States Patent Office 3,027,516
Patented Mar. 27, 1962

3,027,516
MODULATOR SYSTEM FOR MICRO-
POSITIONING TRANSDUCER
Frans Brouwer, Ancaster, Ontario, Canada, assignor to Westinghouse Electric Corporation, East Pittsburgh, Pa., a corporation of Pennsylvania
Filed Feb. 20, 1958, Ser. No. 716,363
Claims priority, application Canada Feb. 22, 1957
5 Claims. (Cl. 328—133)

This invention relates to electric systems, including a transducer, for positioning devices incorporating inductive or capacitive positionally responsve devices.

It has been known in the past to use inductive devices such as differential transformers to indicate relative position of various parts of a mechanical system. Similarly capacitive devices could be used. A preferred form of transducer for such a system and a system incorporating the transducer is described and claimed in applicant's Patent No. 2,961,585, issued on November 22, 1960, entitled Electromechanical Transducer and System, and assigned to the assignee of this application. Such a transducer comprises a first element consisting of a pair of separate contiguous coaxial helical conductive members which are parallel throughout the majority of their length, and connected electrically at one end, a second conductive element having the same axis and pitch as said conductive members but of different radius and axially movable relative thereto. If oscillating electrical energy is supplied to the first element then as the two elements move relative to one another their coupling varies and the signal induced in the second element will vary passing successively from maxima of one phase through minima or nulls to maxima of the opposite phase, and vice versa.

The word "transducer" as herein used designates a device for converting one form of information to another form of information, for example, to convert the magnitude of a mechanical movement of a machine element from a point of reference into an electrical signal of comparable magnitude.

In both the capacitive and inductive forms of the device disclosed in the above mentioned United States Letters Patent No. 2,961,585, the output from the pickup portion of the device is a function of the frequency of the energizing signal. In order to obtain an accurate indication of position it is necessary that the output signal be appreciable. It will, for example, be evident that the greater the maximum amplitude the more definite will be the null indication. If, however, the frequency is increased other problems are introduced, since relatively high frequencies are unsuitable for the operation of servo systems. A convenient way of utilizing the transducer output would be to convert it to direct current, but it will be seen that in order to remove ambiguity the means of converting the high frequency to D.C. must be phase sensitive. If the high frequency from the transducer is applied to a phase sensitive demodulator, drift errors in the demodulator result in a false null, i.e. a zero output from the detector does not always correspond to a null output from the transducer. This in itself would not be objectionable since it might be compensated for, but unfortunately this error is usually variable making compensation very difficult.

With phase sensitive demodulation, another possible source of error is the amplifier. For example, if it is desired to control a servo system with the output from the phase sensitive demodulator then it may be necessary to utilize D.C. amplifiers between the demodulator and the servo system. D.C. amplifiers are notoriously prone to drift and dift errors are of major importance in a system of this type, since variable drift will produce variable movements of the apparent null of the system thus producing non linearity and inaccuracy.

Of course, in systems which are not intended to control servo mechanisms, it would be possible to utilize a dynamometer type of indicator fed directly from the transducer and from the high frequency source. In this case the high frequency would be limited to the maximum frequency which may be used to operate a dynamometer type of instrument, which might lie for example in the neighbourhood of 10,000 cycles. The dynamometer instrument would not be subject to drift but would indicate accurately the phase relationship between the source frequency and transducer output as well as the amplitude of the transducer output. While this solution is quite satisfactory when only an indication is required from a transducer, it is not satisfactory for controllng a servo system and further may not be satisfactory in some circumstances due to the frequency limitations of dynamometer instruments.

It is therefore an object of this invention to provide a system including a transducer operable with frequencies higher than have been practical hitherto.

According to the present invention there is provided a system including a transducer comprising at least one input element and at least one output element, the output from the output element or elements being dependent upon the coupling between said input and output elements, characterized in that the system includes a source of oscillations, means for modulating a signal from the source with a signal of lower repetition frequency and for feeding the resultant modulated signal to the said at least one input element, and means to derive a signal from the output element or elements and demodulate said signal using unmodulated oscillations from the said source.

Thus, for example, the transducer is supplied with a relatively high frequency signal that has been modulated in a suppressed carrier type of modulator by a lower frequency. The output of the transducer is mixed with a portion of the unmodulated oscillator frequency. Demodulation of the mixed signal will result in the recovery of the low frequency component only and the low frequency component will be a positionally responsive phase modulated low frequency signal.

A clearer understanding of the invention may be had from the following description and the drawings, in which.

Figure 1A:
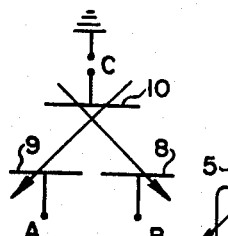
FIGURE 1A is a schematic diagram of a capacitive type of transducer.
Figure 1:
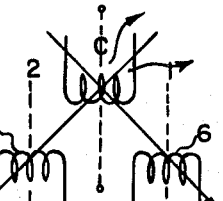
FIGURE 1 is a schematic diagram of an inductive type of transducer.
Figure 1C:
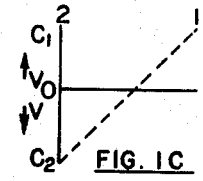
FIGURES 1B and 1C are graphs useful in explaining the operation of the transducers of FIGURES 1A and 1.
Figure 1B:
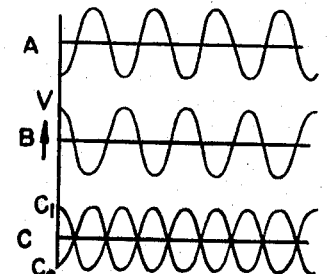

Considering first FIGURE 1, the normal type of inductive transducer will first be described together with its normal applied signals. In such a transducer as is shown in FIGURE 1 there are provided a pair of coils 5 and 6 fixed in position which may be termed the input elements, and a third coil 7 which coil 7 is movable with respect to coils 5 and 6 and thus is variably coupled to the input elements. The variable coupling may also be accomplished by varying the reluctance of the path between coil 7 and coil 5 or 6, or, as stated, it may be accomplished by physically moving coil 7, relative to coils 5 and 6. Let us assume for our purposes that in the particular transducer referred to coil 7 is physically moved between line 1—1 and line 2—2. For the sake of completeness, the equivalent capacitive form of such a transducer is shown at 1A. In this device a pair of input elements 8 and 9, which are essentially conductive plates, are variably coupled to an output plate 10. In both the transducers shown two input signals are supplied, signal A and a signal B (FIG. 1B). It will be noted that these are simply sinusoidal waveforms and are 180° out of phase.

Waveform A of FIGURE 1B is a graphical representation on a basis of voltage versus time of the signal applied to coil 5, or to the capacitive element 9. Similarly waveform B is a graphical representation of a signal applied to coil 6, or to the capacitive element 8. The waveform at C illustrates graphically the signal derived from coil 7 or capacitive element 10. In effect at C there are shown two curves, $C_1$ and $C_2$. When the center line of coil 7 (which is designated as line 0—0) is aligned with line 1—1, then the voltage induced in coil 7 will be in phase with the signal applied to coil 6 and is represented in FIGURE 1B as curve $C_1$. Similarly, when line 0—0 corresponds to line 2—2, the output from coil 7 will correspond to curve $C_2$. At intermediate points the output from coil 7 will vary between these values and when line 0—0 is located at its present illustrated location the output from coil 7 will be a minimum and may be zero. By proper arrangement of the fields of the coils it is possible for the signal from coil 7 to vary linearly from a maximum signal in phase with signal B through zero to a maximum signal in phase with signal A. In FIGURE 1C, this characteristic is illustrated graphically on a basis of voltage versus position. It will be noted that the base line extends from line 2—2 to line 1—1. The voltage scale is presumed to be the output signal from coil 7 on an R.M.S. or peak voltage basis. As will be seen, the signal from coil 7 varies from a value equal to $C_2$ to a value equal to $C_1$ passing through zero at the center point and it is assumed in this case that there is a linear variation from $C_2$ to $C_1$. Similar remarks may be made for the output signal from the capacitive form and for a further discussion of the possible linearity or non-linearity of the transducer device itself, reference is made to the previously mentioned United States Letters Patent 2,961,585 which describes, for example, a form of transducer in which the two coils 5 and 6 would be wound with a pitch considerably greater than their mutual spacing, with the result that each alternate null is more sharply defined but the signal is non-linear and hence difficult to interpolate.

In the graphical representations in FIGURE 1B, the signal C has been shown with the same amplitude as signal A and B. This, of course, will not be the case since the output signal is proportional to the input signal times the mutual coupling between coils 6 and 7, or 5 and 7. In the absence of a truly low reluctance magnetic path, it is difficult to keep the mutual coupling between the pickup coils and the input coil sufficiently high to produce a really useful signal at low frequencies, that is, frequencies in the neighbourhood of 60 to 400 cycles. If on the other hand the frequency is increased the output signal cannot be used directly but must be converted to a voltage proportional to phase as well as amplitude. This may be accomplished by means of a conventional phase detector but, as explained above, such devices are severely troubled by drift and in order to avoid the problems inherent in high frequency operation the system disclosed in FIGURE 2 is used.

Figure 2:
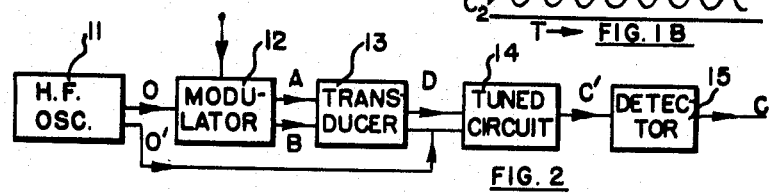
FIGURE 2 is a block diagram of a system in accordance with my invention.
Figure 2A:
FIGURES 2A, 2B, 2C and 2D are graphical representations of signals at various points in this system and are useful in explaining the operation of the system.
Figure 2B:

Considering FIGURE 2, there is shown a high frequency oscillator 11, which produces a sinusoidal output of a frequency for example in the neighbourhood of 500 kilocycles. This signal O is illustrated at 2A. For the purposes of illustration, it has only been represented as being of a frequency in the neighbourhood of 3 kilocycles, but in fact it would normally be a great deal higher. This signal is then modulated in modulator 12 by a low frequency, for example in the neighbourhood of 400 cycles per second. The modulator is a suppressed carrier modulator and therefore gives an output component A as shown in FIGURE 2B, together with another output component B which corresponds exactly to A except that the carrier is 180° out of phase. It will be noted that the signal A (and signal B also) has an envelope shaped corresponding to the low frequency modulating signal and on alternate halves of the modulated signal the carrier simply reverses in phase. Signals A and B are applied to the transducer as previously described and the output from the coil 7 obeys the graphical law set out in FIGURE 1C, varying from a maximum signal in phase with signal A to a maximum signal in phase with signal B.

A suitable suppressed carrier modulator is the modulator shown on page 482, FIGURES 9–13 of Radio Engineering by Terman, Third edition. With this modulator it is possible to produce the desired two output signals simply by connecting coil 5 of the transducer to the modulator with one polarity and coil 6 with reverse polarity.

Figure 2C:
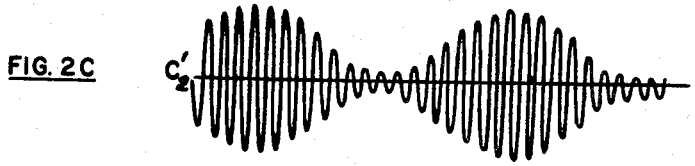
Figure 2D:

If now this output is mixed with a portion O' of the oscillator output the result is shown in FIGURE 2C, it being assumed in FIGURE 2C that the transducer centre line 0—0 is aligned with line 2—2 and therefore the output from coil 7 is a maximum in phase with signal A. The resultant mixed signal $C'_2$ is shown at 2C. If on the other hand, the centre line of the pickup coil 7 had been on line 1—1, the output would have appeared identical to $C'_2$ except the modulation envelope would have been shifted 180°. The $C'_2$ signal is now applied to a simple detector circuit and integrator which detects the peak values of the carrier on one side of the centre line, integrates these peaks and derives a signal C corresponding to one side of the modulation envelope. Signal C is illustrated at FIGURE 2D and is actually shown as two curves, $C_1$ and $C_2$, $C_1$ being the signal produced when the centre line 0—0 is aligned with line 1—1 and $C_2$ being produced when the centre line 0—0 is aligned with line 2—2. The output signal C therefore is a continuously variable sinewave varying from a maximum in phase with the low frequency modulating signal to a maximum 180° out of phase with the low frequency modulating signal.

It will be seen that the signal C illustrated in FIGURE 2D corresponds exactly with the signal C illustrated in FIGURE 1B. The essential improvement in the system is of course in the fact that the voltage induced in the pickup coil is a high frequency voltage and that a much more efficient transfer of energy is accomplished between the signal coils 5 and 6 and the pickup coil 7, and yet nevertheless the system is drift free since the output signal is a phase sensitive low frequency which is produced not by a phase sensitive detector but by mixing the high frequency transducer output with the oscillator frequency. Any variation of the oscillator frequency will be ineffective to produce errors since the oscillator frequency is compared with its own frequency.

After amplification, the low frequency output C may then be used directly to actuate A.C. servo motors or phase sensitive indicators as for example a dynamometer. The tuned circuit 14 operating as it does at high frequency produces a very sensible increase in gain. For example, the output signal C when operating at high frequency, in the system shown in FIGURE 2, may be as much as 100,000 times as great as the signal produced when the input signals to the transducer are low frequency signals.

While the system in FIGURE 2 has been described exclusively in relation to the transducer shown in FIGURE 1, it will be understood that it can similarly be applied to the transducer of FIGURE 1A and here again there is a great increase in the output signal from output element 10. It will also be understood that the system is applicable to numerous types of transducers, it is only necessary that the transducer utilize the high frequency to accomplish a more efficient transfer of energy from the input elements to the output elements.

I claim:
1. In a servo system, including an electro-mechanical transducer including at least two differentially coupled like input elements and at least one output element, the output from said output element being dependent upon the respective positional intercoupling between said input elements and said output element, a source of alternating current, a modulator coupled to said source and producing a suppressed carrier modulated output, means to supply said modulated output to one of said input elements, means to supply to another of said input elements a similar modulated output from said modulator of reverse phase, means to combine the resultant output from said output element with a portion of said alternating current, means to detect the resultant combined signal and derive the modulation signal.

2. In a servo system including an electro-mechanical transducer dependent upon mutual coupling to produce its output, means to effect the operation of said transducer at a relatively high frequency to improve the coupling but without necessitating the use of the output either as a high frequency signal or as a D.C. signal, including a source of said high frequency which low frequency may have a range from 60 to 400 cycles per second, means to modulate said high frequency in a suppressed carrier modulator at a relatively low frequency, means to supply said modulated high frequency to said transducer, means to combine the output of said transducer with a portion of the unmodulated high frequency and means to derive from said combined signal, a low frequency signal responsive to the transducer positional condition.

3. In a servo positioning system including an electro-mechanical transducer including a pair of differentially coupled input coils and a relatively movable output coil, positional responsive means for varying position of the output coil with respect to the input coils to vary the mutual coupling between said input coils and said output coil, a source of high frequency alternating current having a frequency in the kilocycle range, a suppressed carrier modulator, means to modulate said high frequency with a low frequency, which may be less than 400 cycles per second, in said suppressed carrier modulator, means to apply the resultant modulated signal to one of said input coils, means to apply a similar modulated signal of opposite phase to the other of said input coils, means to combine the output from said output coil with a portion of said high frequency alternating current and a detector for deriving the modulation envelope of the resultant mixed signal.

4. In a servo system, including an electromechanical transducer including a pair of differentially wound input coils and a movable output coil, means to vary the mutual coupling between said input and said output coils by moving the output coil, a source of high frequency energy means in the range of many kilocycles and a relative low frequency source connected to modulate said high frequency energy and suppress the carrier to produce a modulated high frequency with a modulation envelope which conforms to the modulating frequency and which reverses in phase on alternate half cycles of the modulating frequency, means to apply said modulated high frequency to one of said input coils, means to apply said modulated high frequency in reverse phase to the other of said input coils, means to combine the output from said output coil and a portion of said high frequency energy, and a detector to derive from said combined frequencies a low frequency equal in frequency to said modulating frequency and responsive in phase and amplitude to the mutual coupling between said input and output coils.

5. A servo system comprising a transducer having electrical input and output elements mounted for relative movement to vary the mutual coupling therebetween, a source of high frequency alternating current, a source of substantially lower frequency alternating current, means connected to said sources for modulating said high frequency source in a suppressed carrier modulator at said lower frequency, means coupling said modulating means to the input element of said transducer for supplying the latter with said modulated high frequency, means coupling the output element of said transducer with said unmodulated high frequency source, and means to derive from said combined signal a low frequency corresponding to the relative position of the transducer elements.

References Cited in the file of this patent

UNITED STATES PATENTS

| | | |
|---|---|---|
| 1,428,156 | Espenschied | Sept. 5, 1922 |
| 2,183,399 | Heising | Dec. 12, 1939 |
| 2,218,636 | Bauckner | Oct. 22, 1940 |
| 2,429,216 | Bollman et al. | Oct. 21, 1947 |
| 2,444,726 | Bussey | July 6, 1948 |
| 2,506,276 | Olsson | May 2, 1950 |
| 2,569,268 | Wild | Sept. 25, 1951 |
| 2,615,936 | Glass | Oct. 28, 1952 |
| 2,886,657 | Hirtreiter | May 12, 1959 |